United States Patent [19]

Dickey

[11] 4,008,425
[45] Feb. 15, 1977

[54] MOTOR SERVO SYSTEM WITH MULTIPLIER MEANS TO DRIVE AND SERVO THE MOTOR

[75] Inventor: Baron Christian Dickey, Palo Alto, Calif.

[73] Assignee: Ampex Corporation, Redwood City, Calif.

[22] Filed: Jan. 9, 1975

[21] Appl. No.: 539,781

[52] U.S. Cl. .............................. 318/314; 318/313; 318/327; 318/254

[51] Int. Cl.² ........................................ H02P 5/06

[58] Field of Search .......... 318/313, 314, 326, 327, 318/328, 608, 640, 254, 138, 227

[56] References Cited

UNITED STATES PATENTS

| | | | |
|---|---|---|---|
| 3,375,422 | 3/1968 | Boudigues | 318/254 X |
| 3,740,629 | 6/1973 | Kohlhagen | 318/138 |
| 3,829,747 | 8/1974 | Woolfson et al. | 318/314 X |
| 3,831,073 | 8/1974 | Tanikoshi | 318/314 X |
| 3,849,709 | 11/1974 | Berman et al. | 318/313 X |
| 3,906,320 | 9/1975 | Doemen | 318/138 |
| 3,942,084 | 3/1976 | Louth | 318/254 |
| R28,567 | 10/1975 | Matthey et al. | 318/314 |

*Primary Examiner*—B. Dobeck

[57] ABSTRACT

The rotation of a motor is sensed and a signal indicative of any error in desired motor speed or phase is multiplied by the angular position of the motor shaft. The resulting product defines a sinusoidal drive signal which is amplified and introduced to the motor windings. As the error signal varies, the sinusoidal drive signal amplitude varies therewith to slow down or speed up the motor accordingly. Thus the invention provides both drive and servo control to a motor from a multiplier device disposed within the servo circuit. The multiplication process provides the ideal drive signal since the motor windings are driven with continuously varying drive signals, which provides accordingly a constant motor torque output inherently free from velocity variations.

6 Claims, 5 Drawing Figures

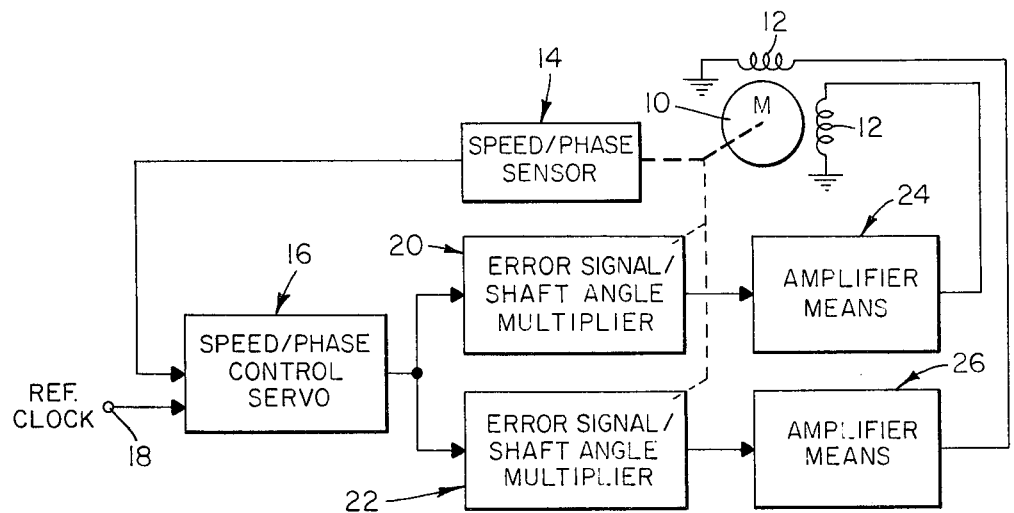
FIG_1
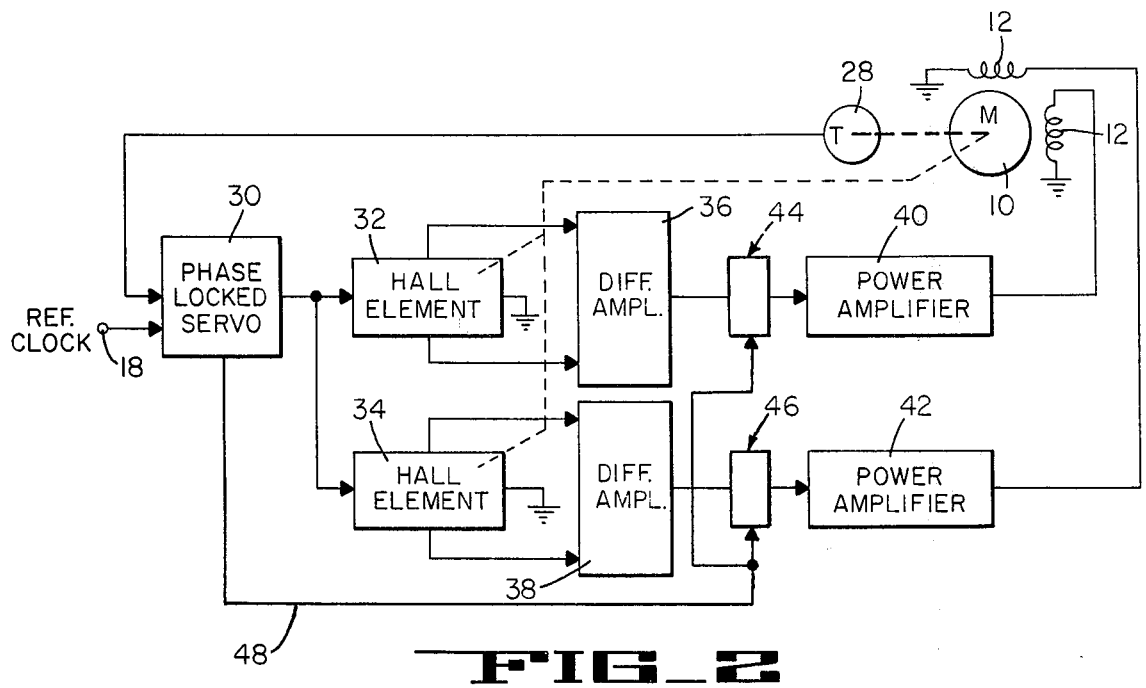
FIG_2
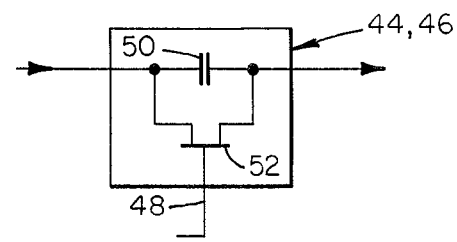
FIG_3

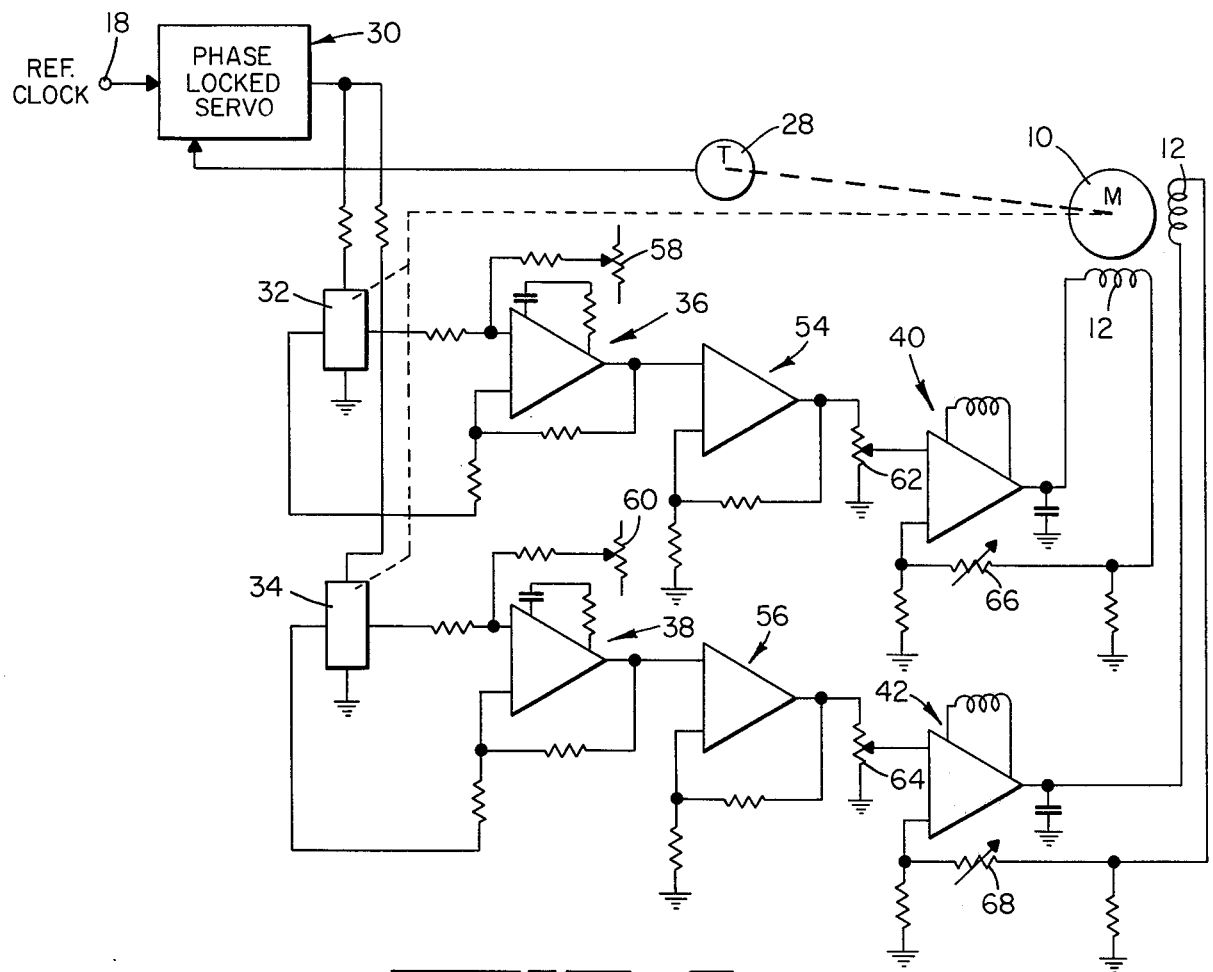
FIG_4
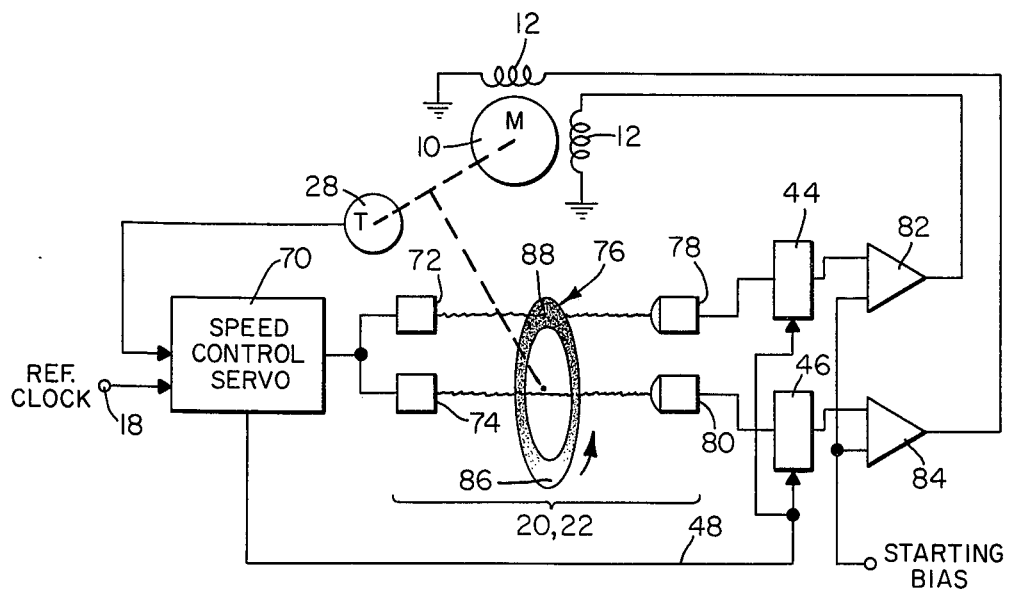
FIG_5

MOTOR SERVO SYSTEM WITH MULTIPLIER MEANS TO DRIVE AND SERVO THE MOTOR

The invention herein described was made in the course of a contract with the U.S. Department of Defense.

BACKGROUND OF THE INVENTION

1. Field

The invention relates to motor servo systems and particularly to a servo drive system which utilizes a Hall or optical element as multiplier means to drive as well as servo control a motor.

2. Prior Art

Typical prior art servo systems for controlling motor speed are those commutated by conventional brushes, by brushless means, by Hall elements, etc. Motors commutated by conventional brushes generate torque and velocity perturbations which cannot be tolerated in high precision motor drive systems, have serious top speed limitations, generate unacceptable electrical interference, etc.

Brushless motors in general have been of the bipolar type, wherein those with four coils and two poles, or with two coils with intermediate taps, have large variations in torque produced within one revolution of 360°. At slow speeds such as 1000 rpm, intense vibrations and variations in rotational speed are generated.

Motors employing Hall elements provide multipolar brushless commutations while supplying switching signals to a digital commutator. This drive system generates undesirable torque and velocity perturbations in the motor which also are unacceptable in high precision systems. That is, the motor is driven with square wave drive signals which produce discrete torque perturbations during motor rotation, i.e., the torque generated has discrete discontinuities which appear as very small velocity perturbations.

The above prior art drive systems in general require additional motor drive amplifiers which adds complexity to the motor drive, particularly in a bidirectional drive system.

SUMMARY OF THE INVENTION

The present invention overcomes the shortcomings of separate prior art drive or servo systems by providing brushless commutation while employing multiplying means such as Hall elements, optical apparatus, etc., which directly drive the windings of the motor with more efficient sine wave drive signals, while also providing servo control of the motor. Thus in the invention combination the motor drive amplifier and commutator are one unit to simplify the system, while providing a servo drive for generating a constant torque output which is inherently free from velocity perturbations.

To this end, an error signal indicative of the speed, or phase, error of a motor is introduced to multiplying means. Means integral with the multiplier provides a shaft position indication thereto. The multiplier means multiplies the error signal times the angular position of the motor shaft to inherently produce drive signals of sinusoidal waveform and selected phase, which in turn are introduced to the windings of the motor via selected amplifier means to provide both drive and servo control for the motor.

BRIEF DESCRIPTION OF THE DRAWINGS

FIG. 1 is a block diagram depicting the basic combination of the invention.

FIG. 2 is a block diagram of one embodiment of the invention combination.

FIG. 3 is a schematic diagram of an adjunct circuit for providing A.C. coupling for the invention combination.

FIG. 4 is a schematic diagram showing in detail the combination of FIG. 2.

FIG. 5 is a block diagram depicting an alternative embodiment of the invention combination.

DESCRIPTION OF THE PREFERRED EMBODIMENTS

Referring to FIG. 1, a motor 10 is shown herein with two windings 12. The motor may have a plurality of windings other than two, as further discussed hereinafter. The shaft of motor 10 is coupled to speed/phase sensor means 14, which generates a tachometer signal indicative of the motor speed or angular position. The tachometer signal from the speed/phase sensor means 14 is introduced to speed/phase control servo means 16, along with a reference clock via input 18. The speed/phase control servo means 16 may be either a velocity servo circuit, or a phase locked servo circuit, which generates an error signal which is proportional to the motor velocity or phase error, with respect to the external reference clock provided via the input terminal 18. The external reference may be a clock in the phase locked system, or may be a D.C. level representing the desired motor speed in the case of a velocity servo system.

The error signal from the speed/phase control servo means 16 is introduced to (a pair of) error signal/shaft angle multiplier means 20, 22. The latter means constitute multiplying devices for generating a pair of motor drive signals which equal the product of the velocity or phase error times the motor shaft position. The drive signal from multiplier means 22 is 90° out of phase with the signal from means 20, i.e., the drive signals herein are sine and cosine. The drive signals are introduced to respective amplifier means 24, 26 which generate the actual drive signals of sufficient voltage or current to drive the motor windings 12 of the motor 10. Thus sinusoidally varying output currents are fed to respective windings 12 to generate a constant torque as the motor shaft rotates.

To provide motor servo control, as the motor load and/or speed varies, the tachometer signal from the speed/phase sensor means 14 varies in accordance therewith. The speed/phase control servo means 16 determines the velocity or phase error variations, and generates an error signal magnitude in proportion therewith. As the error signal varies, the output from the error signal/shaft angle multiplier means 20, 22 will vary accordingly to provide a voltage output of proportional amplitude. The amplifier means 24, 26 provide in effect a voltage-to-current conversion, and the sinusoidal current drive signals introduced to the windings 12 vary in magnitude to generate proportionally greater or lesser torque in the motor. As a result the motor pulls back into the preselected speed determined by the reference clock via input 18.

It may be seen that the invention servo system utilizes the inherent characteristic of the multiplier means 20, 22 for producing a sinusoidal drive signal for driving a motor while simultaneously providing precise speed control for the motor.

FIG. 2 illustrates an embodiment of the basic combination of FIG. 1, utilizing Hall elements as the error signal/shaft angle multiplier means 20, 22. The shaft of motor 10 is coupled to a tachometer 28, whose tachometer output is in turn fed to a phase locked servo 30, which constitutes the speed/phase control servo means 16 of FIG. 1. The servo 30 may also be a speed control servo rather than a phase locked servo. The phase locked servo 30 also receives the reference clock of previous mention via the input 18. The output from the servo 30 is voltage proportional to the phase difference between the tachometer signal from the tachometer 28, and the reference clock via input 18, and thus is indicative of the motor phase error. The error signal from servo 30 is fed to the control current inputs of a pair of Hall elements 32, 34 which are physically mounted in the motor stator adjacent to the rotor thereof (not shown). In such a location, the Hall elements 32, 34 are in the presence of the magnetic field produced by the residual flux of the rotor shaft. As the shaft rotates so does the field which affects the Hall elements. Accordingly, the drive signals from the Hall elements are sinusoidal waveforms whose phase is inherently locked to the rotor of the motor 10, and whose amplitudes are proportional to the error signal generated by the phase locked servo 30. It may be seen that the drive signals generated by the Hall elements 32, 34 are thus a product of the control current introduced thereto (i.e., the phase error from servo 30) and the magnetic field of the rotor shaft, the latter providing a continuous indication of the shaft position. The signals from the Hall elements are of a differential nature and are accordingly fed to respective differential amplifiers 36, 38 for detection and amplification. The resulting signals from the differential amplifiers 36, 38 are fed to respective power amplifiers 40, 42 for further amplification and introduction to the respective windings 12 of motor 10, thereby completing the servo drive system.

As may be seen, the motor drive amplifier and commutator of the invention combination are included in one unit, which simplifies the system and improves effectivity. The Hall elements installed in the motor inherently provide sine wave outputs which after amplification are the ideal inputs for the motor windings for producing a constant torque output which is inherently free from velocity variations. In addition, higher efficiency is achieved due to a reduction of eddy current loss due to the use of the sinusoidal waveform, with a reduction of commutation losses.

To provide 90° out-of-phase outputs from the Hall elements 32, 34, i.e., a sine or cosine waveform, the Hall elements are embedded in the motor stator at 90° to each other. The preferred embodiment utilizes one Hall element per channel of servo drive electronics, i.e., one Hall element per winding in the motor 10. Thus for a two-phase, two-pole motor two Hall elements are utilized; for a three-phase motor, three Hall elements and three channels of servo drive electronics are preferred. The use of one multiplying means per winding of the motor provides a relatively simple motor servo system as contemplated by the invention combination.

In a servo system such as that of FIG. 2, direct coupling is preferable during starting of the motor 10, since the servo drive circuit requires information as to the static position of the motor during that period. However, Hall elements 32, 34 are somewhat subject to drift problems and a small D.C. component can build up over a period of time. The D.C. component may produce a once-around error in the shaft rotation, thus causing a torque variation. Accordingly, there is shown a modification to the circuit of FIG. 2 which converts the servo system from a direct coupled amplifier configuration to an A.C. coupled amplifier configuration. To this end, A.C. coupling circuits 44, 46 are inserted between the differential amplifiers 36, 38 and the power amplifiers 40, 42, respectively. The A.C. coupling circuits 44, 46 switch from a D.C. coupled condition during start-up of the motor, to an A.C. coupled condition after the motor gets up-to-speed. The condition of up-to-speed is sensed by the phase locked servo 30, and a switching signal generated therein is introduced via line 48 to switch the coupling circuits 44, 46 to A.C. coupling. The switching signal is generated by sensing the phase locked condition in the servo 30, and generating a D.C. voltage when the system is in lock.

As shown in FIG. 3, the A.C. coupling circuits 44, 46 may include a capacitor 50 in series with each signal path, and a FET 52 coupled across the capacitor. When the switching voltage is at a level indicating the phase non-locked state, i.e., when the motor is out-of-speed, the FET 52 is pushed into conduction, which allows the drive signals from the differential amplifiers 36, 38 to bypass the capacitor 50. As the motor 10 comes up-to-speed, the voltage level indicating in-lock is delivered via line 48 to the A.C. coupling circuits 44, 46, which removes the FET 52 from conduction, thereby providing A.C. coupling through the capacitor 50. The FET 52 shown in FIG. 3 may be replaced by an integrated circuit, which constitutes generally an analog switch energized via selected levels of the switching signal from the servo 30.

FIG. 4 depicts in greater detail the schematic of the block diagram of FIG. 2 wherein like components are similarly numbered. Thus motor 10 includes windings 12, and a shaft thereof coupled to the tachometer 28, which in turn is coupled to the phase locked servo 30. The reference clock is provided via terminal 18, and an error signal is provided from the servo 30 to the Hall elements 32, 34. The differential signals derived from the Hall elements are fed to the differential amplifiers 36, 38, and thence to drive amplifiers 54, 56 respectively for further amplification. Potentiometers 58, 60 are coupled to the differential amplifiers 36, 38 respectively to perform a balance function, whereby the output of the differential amplifiers is centered about zero prior to starting the motor or while the motor is running.

The signals from amplifiers 54, 56 are herein shown coupled to the power amplifiers 40, 42 respectively via potentiometers 62, 64, which may be included to provide gain compensation, i.e., adjustment of the system gain. The potentiometers 62, 64, as well as the drive amplifiers 54, 56, are not essential and are shown by way of example.

Likewise, potentiometers 66, 68 may be included with the power amplifiers 40, 42 respectively to provide an adjustment from the voltage input-to-current output conversion, to set that gain function, but are not essential to the system. The power amplifiers 40, 42 drive the motor windings 12 while performing the voltage-to-current conversion. The output current is thus proportional to the input voltage, and the servo system provides a sinusoidally varying current to the windings 12. In turn, the motor generates a constant torque which is inherently free from velocity variations.

FIG. 5 depicts another configuration for implementing the invention combination wherein the multiplying process is effected via photosensitive devices in place of the Hall elements. Motor 10 with windings 12 has its shaft coupled to a tachometer 28, which supplies a tachometer signal to a speed/phase control servo such as that shown in FIG. 1. The servo in FIG. 5 is specifically depicted as a speed control servo 70, by way of example only. The reference clock consisting of a preselected D.C. voltage, is introduced to the servo 70 via input 18, and the servo 70 generates an error signal which is introduced to the error signal/shaft angle multiplier means 20, 22. The latter means in FIG. 5 herein comprise the photosensitive devices of previous mention.

By way of example, the photosensitive device includes light sources 72, 74 disposed to generate a pair of light beams which vary in intensity in accordance with any motor speed/phase error. The light beams are directed through an appropriately shaped photomask 76 which rotates with the shaft of the motor 10. The photomask 76 has a varying light transmission/reflectivity characteristic, which further modulates the light beams to perform the multiplying function inherent in the invention combination. The light beams are disposed at 90° to each other with respect to the circular photomask 76, and thence impinge a pair of photodetectors 78, 80 respectively. The outputs from photodetectors 78, 80 comprise the sine and cosine drive signals introduced to respective power amplifiers 82. 84 via respective A.C. coupling circuits 44, 46 similar to those in FIG. 2. The switching signal is introduced from the servo 70 to the coupling circuits 44, 46 via the line 48. The power amplifiers 82, 84 introduce the resulting amplified sinusoidal drive signals to the windings 12 of motor 10.

Thus, the rotating mask 76 provides means for selectively modulating the light beams in accordance with the motor position, whereby the signal output from the photodetectors 78, 80 are angular position varying with the rotation of the shaft, and are amplitude varying with the incident light from the light sources 72, 74, which in turn are amplitude varying in accordance with the motor speed/phase error. As may be seen, the photosensitive embodiment of FIG. 5 does not utilize a magnetic interaction between the motor and the multiplying device, as is the case in the Hall element configuration of FIGS. 2, 4. Thus in the servo system of FIG. 5 there are fewer physical connections to the motor from the servo/drive system, which provides an advantage of eliminating interaction effects between the magnetic fields generated by the motor windings and the magnetic fields generated by the residual flux of the motor shaft.

The photomask 76 may be flat, cylindrical, etc., in shape, and may be a variable transmission or variable reflectivity device; i.e., the light may pass through, or reflect from, the photomask. The photomask is specially constructed to generate a sinusoidally varying light signal in proportion to rotation of the motor shaft, as detected by the photodetectors 78, 80, i.e., the mask is clear at a point 86, is opaque at a point 88 180° away, and is selectively graduated in opacity therebetween. Thus the light is modulated by the photomask 76 to generate a sinusoidal signal which is proportional to the shaft angle, or shaft position. Thus the photosensitive system of FIG. 5 provides a multiplying means which multiplies the shaft angular position by the error signal generated via the speed control servo 70, to provide accordingly a sinusoidally varying output from the photodetectors 78, 80. The resulting drive signals introduced to the windings via the power amplifiers 82, 84 are ideal sine waves.

The photomask may be formed by a band of varying reflectivity disposed about the circumference of a cylinder, wherein the light beams from the light sources 72, 74 are reflected at an angle back into the photodetectors 78, 80 (not shown), at positions 90° about the cylinders' circumference.

I claim:

1. A servo/drive system for introducing sinusoidal drive signals to the windings of a motor having at least two windings, comprising the combination of;

tachometer means coupled to the motor for generating a tachometer signal indicative of the speed/phase characteristics and thus of the rotational error of the motor;

speed/phase control servo means coupled to the tachometer means;

means for providing a reference clock to the speed/phase control servo means, wherein the speed/phase control servo means generates the error signal by a comparison of the signal from the tachometer means and the reference clock;

error signal/shaft angle multiplier means including at least two Hall element means integral with the motor and coupled to the speed/phase control servo means and to respective windings of the motor with no switching therebetween, the multiplier means being responsive to the angular position of the rotor to inherently generate within the multiplier means sinusoidal drive signals for each respective winding which are the product of the instantaneous rotational error of the motor times the instantaneous angular position of the motor shaft;

means for continuously introducing the sinusoidal drive signals to each of respective motor windings simultaneously, and including amplifier means continuously coupled between the error signal/shaft angle multiplier means and each of the motor windings; and said sinusoidal drive signals having amplitudes proportional to the signals indicative of the rotational error, and phase proportional to the motor angular position, which drive signals provide both motor drive and servo control for the motor.

2. The system of claim 1 wherein the Hall element means are coupled to the speed/phase control servo means and responsive to the residual magnetization of the motor shaft for generating the respective sinusoidal drive signals indicative of the motor position; and wherein the amplifier means includes differential amplifiers coupled to respective Hall element means and operatively coupled to respective motor windings simultaneously.

3. The system of claim 2 wherein the Hall element means generate sine and cosine waveform outputs respectively disposed at 90° to each other.

4. The system of claim 3 further including:

A.C. coupling means disposed between the Hall element means and the differential amplifiers and responsive to the speed/phase control servo means, for switching the system from a D.C. coupled condition during start-up of the motor, to and A.C. coupled condition after the motor reaches the desired speed.

5. The system of claim 1 wherein the tachometer means generates a signal indicative of the phase errors of the motor;

the speed/phase control servo means comprises a phase-locked servo; and the reference clock is a clock signal representing the desired motor speed.

6. The system of claim 1 wherein the tachometer means generates a signal indicative of the speed errors of the motor;

the speed/phase control servo means comprises a speed control servo; and the reference clock comprises a D.C. level representing the desired motor speed.

* * * * *